US008247756B1

(12) United States Patent
Veitch et al.

(10) Patent No.: US 8,247,756 B1
(45) Date of Patent: Aug. 21, 2012

(54) BI-DIRECTIONAL DATA AND SIGNAL CHANNELS IN OPTICAL INTERCONNECTS

(75) Inventors: Randall C. Veitch, Nazareth, PA (US); Thomas W. Stone, Hellertown, PA (US)

(73) Assignee: Wavefront Research, Inc., Bethlehem, PA (US)

( * ) Notice: Subject to any disclaimer, the term of this patent is extended or adjusted under 35 U.S.C. 154(b) by 400 days.

(21) Appl. No.: 12/477,729

(22) Filed: Jun. 3, 2009

Related U.S. Application Data

(60) Provisional application No. 61/058,377, filed on Jun. 3, 2008.

(51) Int. Cl.
*G01J 1/04* (2006.01)
*H04B 10/08* (2006.01)

(52) U.S. Cl. .................. 250/227.11; 398/12; 398/135

(58) Field of Classification Search .......... 250/227.11; 398/12, 19, 107, 111, 135, 138–140
See application file for complete search history.

(56) References Cited

U.S. PATENT DOCUMENTS

| 6,879,784 B1 | 4/2005 | Blair et al. |
| 6,965,735 B2 * | 11/2005 | Wu et al. ................... 398/12 |
| 7,015,454 B2 | 3/2006 | Stone |
| 7,369,776 B2 | 5/2008 | Masahiko |
| 7,446,298 B1 | 11/2008 | Stone |
| 2007/0036493 A1 * | 2/2007 | Brenner et al. ................ 385/89 |

OTHER PUBLICATIONS

Doany, F.E. et al. 160-Gb/s Bidirectional Parallel Optical Transceiver Module for Board-Level Interconnects Using a Single-Chip CMOS IC. Proc. 57th Elec. Comp. Tech. Conf. 2007, 1256-1261.
U.S. Appl. No. 61/058,377, filed Jun. 3, 2008, entitled Bi-Directional Optoelectronic Channels.
Horowitz, P. et al. (1980) The Art of Electronics. Cambridge: Cambridge University Press, p. 521.

* cited by examiner

*Primary Examiner* — Thanh Luu
(74) *Attorney, Agent, or Firm* — Burns & Levinson LLP; Jacob N. Erlich; Orlando Lopez

(57) ABSTRACT

In one embodiment, the present teachings provide for an efficient means to implement bidirectional data and signal channels in optical interconnects. Each optical interconnect channel may include two pairs of emitters and detectors that are imaged onto each other. Many such bidirectional optical channels may be simultaneously interconnected in dense two-dimensional arrays. The send or receive state of each bidirectional optical channel may be directly set in some embodiments by an electronic control signal. In other bidirectional optical channel embodiments, the send/receive state may be controlled locally and autonomously as derived from the output of the local detector.

16 Claims, 10 Drawing Sheets

<15.5 mW when transmitting
<15.5 mW when receiving
< 1 mW mode-switching overhead

BI-DIRECTIONAL DATA AND SIGNAL CHANNELS IN OPTICAL INTERCONNECTS

CROSS REFERENCE TO RELATED APPLICATIONS

This application claims priority to U.S. Provisional Application Ser. No. 61/058,377, filed Jun. 3, 2008, entitled BI-DIRECTIONAL OPTOELECTRONIC CHANNELS, which is incorporated herein by reference in its entirety.

STATEMENT OF FEDERALLY SPONSORED RESEARCH OR DEVELOPMENT

This invention was made in part with U.S. Government support from the U.S. Air Force under contract #F30602-03-C-0213 and from the U.S. Air Force under contract #FA8750-04-C-0250. The U.S. Government has certain rights in the invention.

BACKGROUND

These teachings relate generally to alignment tolerant optical interconnects and, more particularly, to bidirectional channels incorporated into optical interconnects such as the Optical Data Pipe (ODP). The optical data pipe technology is described in detail in U.S. Pat. No. 7,015,454, incorporated by reference herein in its entirety, and related cases.

In one embodiment of the optical interconnect system or optical data pipe approach of U.S. Pat. No. 7,015,454, mating emitter and detector arrays are pre-aligned and fixed on or near the ends of a gradient index rod imager, and this flexible pre-aligned structure is then mounted to the host. In another embodiment infinite conjugate imagers are used to produce Optical Data Pipe modules that are useful for interconnecting chips, boards, backplanes, etc. with generous alignment tolerances in all degrss of freedom. Using these technologies hundreds or thousands of high bandwidth channels can be interconnected for short distances (intra-die, between neighboring chips or MCMS), board to board, board to backplane, or over relatively long distances (full board wrap-around, board-to-board, computer to peripheral, computer to computer, etc.). The optical interconnect system of U.S. Pat. No. 7,015,454 provides a nearly lossless one-to-one optical interconnection from a set of input channels to a set of output channels, and supports extreme density, low power, and low crosstalk for high bandwidth signals.

SUMMARY

In one embodiment, the present teachings provide for an efficient means to implement bidirectional data and signal channels in optical interconnects. In some embodiments each optical interconnect channel may include two pairs of emitters and detectors that are imaged onto each other. Many such bidirectional optical channels may be simultaneously interconnected in dense two-dimensional arrays. The send or receive state of each bidirectional optical channel may be directly set in some embodiments by an electronic control signal. In other bidirectional optical channel embodiments, the send/receive state may be controlled locally and autonomously as derived from the output of the local detector. And in still further optical bidirectional channel embodiments, the send/receive state of the bidirectional channel may be controlled by a dedicated control channel. This dedicated control channel may be used to set the states of one, many, or all optical bidirectional channels in an array of optical bidirectional channels.

For a better understanding of the present teachings, together with other and further objects, reference is made to the following description taken in conjunction with the accompanying drawings, and its scope will be pointed out in the appended claims.

DETAILED DESCRIPTION

An optical interconnect system having one or more optical sub-systems, the one or more optical sub-systems having a first end and a second end, and further having preselected dimensions and optical properties and components emitting electromagnetic radiation and/or components receiving emitted electromagnetic radiation fixedly secured to the first and second ends of the one or more optical sub-systems are disclosed in disclosed in U.S. Pat. No. 7,015,454 and in U.S. Pat. No. 7,446,298, both of which are incorporated by reference herein in their entirety (such optical interconnect systems are also hereinafter referred to as optical data pipes).

Figure 1A:
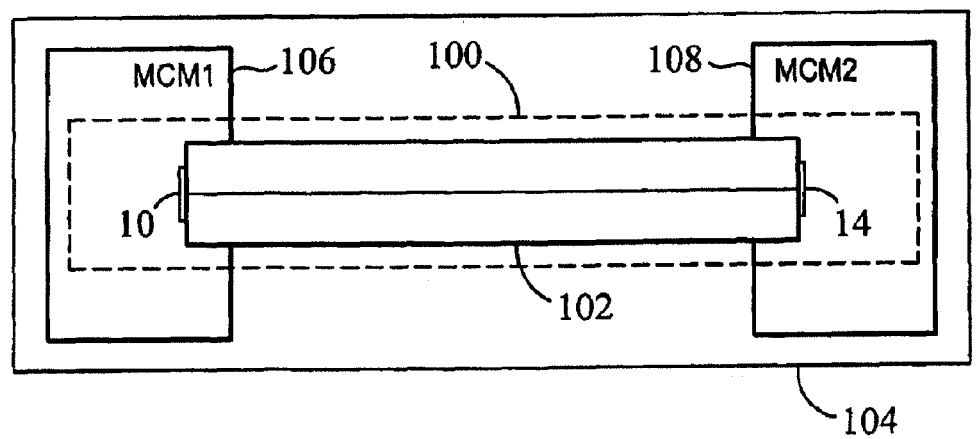
FIG. 1a is a schematic graphical representation of an embodiment of an optical data pipe (ODP), a Point-to-Point Optical Data Pipe in this example.

An embodiment of an optical data pipe 100 is illustrated in FIG. 1a, where the term optical data pipe may also be referred to herein on occasion as optical interconnect 100. Here mating interconnection planes 10 and 14 are affixed to the ends of an optical subsystem (in one instance, not a limitation of these teachings, a gradient index (GRIN) rod imager) 102, and this flexible pre-aligned structure is then mounted to the components 106 and 108 of host 104 which provides dense interconnection. The device array or interconnection planes 10 and 14 can contain emitters, detectors, or general optical channel ports such as arrays of free-space channels or guided wave (fiber) channels, or the like. Embodiments utilizing more than one optical subsystem are disclosed in U.S. Pat. No. 7,015,454 and in U.S. Pat. No. 7,446,298. There are a variety of optical interconnects discussed in the referenced patents including Optical Data Pipes, Board-to-Board Optical Data Pipes, and Point-to-Point Optical Data Pipes. For the purpose of the discussion below, a broad variety of optical interconnects can be used to interconnect the planes of "emitters" (used in this discussion to mean any light emitting device such as VCSELs, LEDs, SLEDs, waveguides, transmitter, optical fibers, etc.) and "receivers" (used in this discussion to mean any light emitting receiving device such as detectors, waveguides, receiver, other optoelectronic devices, etc.). "Optical interconnects" is used in this discussion to include for example lenses, mirrors, optical fibers, waveguides, diffractive optics, etc. and combinations, with a function to couple light from emitting channels at each side of the optical interconnect to corresponding receiver channels at opposing ends or sides of the optical interconnect. The term optical interconnect is thus used generally in the description below to mean any of a broad variety of optical interconnects that accomplish this function, and is not limited specifically to Optical Data Pipe Optical Interconnects.

A number of modes of operation can be used to accommodate a bi-directional link, whether it is electronic or optically-based. In some embodiments one side of the bi-directional link may act as the master or priority side.

There are significant differences between uni- and bi-directional channels in an optical interconnect. The context of channels in Optical Data Pipes is described here, but there is a broader applicability of the embodiments of the present teachings to optical interconnects in general.

Figure 1B:
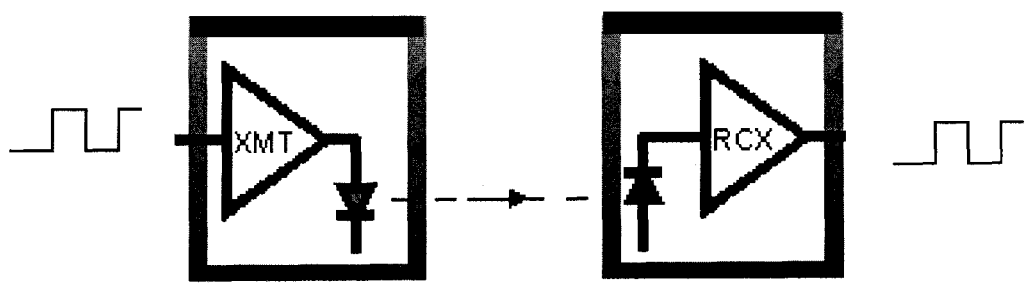
FIG. 1b is a schematic of a uni-directional ODP channel of an embodiment of these teachings.

A uni-directional optoelectronic channel in general requires a transmitter (emitter) such as a VCSEL, LED, SLED, waveguide, etc., although not limited to these embodiments, at one end and a receiver or receiver/driver such as, but not limited to, a detector and amplifier, waveguide, etc., at the other end. This is illustrated in FIG. 1b, where the input signal is shown at left input to the transmit (XMT) side of the uni-directional interconnect The optical interconnect (represented by the dashed line) couples light emitted from the emitter at the left side of the optical interconnect to the receiver at right. The output signal produced is shown at right.

Figure 2:
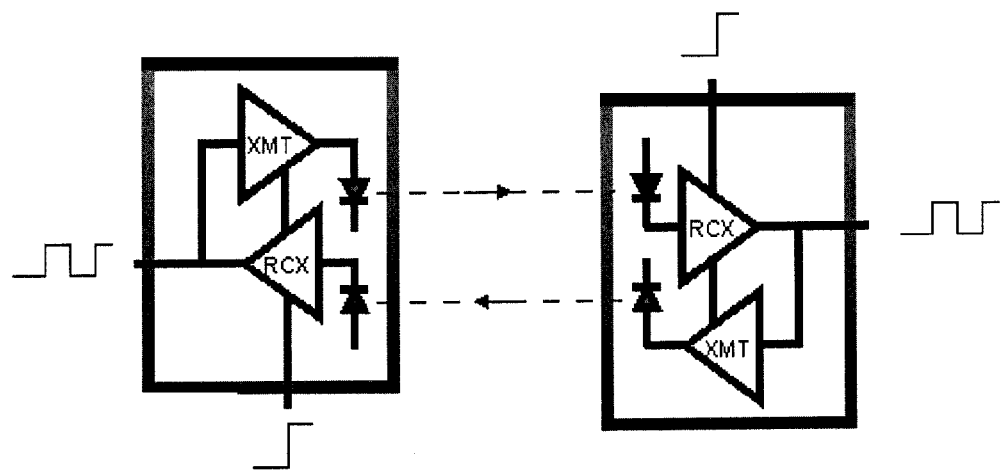
FIG. 2 is a schematic of an ODP channel of an embodiment of these teachings.

For the bi-directional case a combination transmitter/receiver set may be required at either end of the signal line. One embodiment of a single bi-directional ODP channel is illustrated in FIG. 2. The bidirectional data input/output is shown by the waveforms at left and right. In this bi-directional optoelectronic channel embodiment, a switch is used to toggle the channel between transmit and receive modes, and typically the channel is never performing both functions simultaneously. Usually, when one side is in transmit mode, the other side is in receive mode. The switch input is shown by the signals at bottom left and top right of FIG. 2. Each such bidirectional optoelectronic channel of the embodiment shown in FIG. 2 consists of an emitter and receiver on each side. The optical interconnect functions to connect or couple light from the emitter on one side to the detector on the other side.

Note that a bi-directional channel as described above functions as a typical bi-directional channel implemented electronically, and is very different from two opposite pointing uni-directional channels. This is discussed in greater detail below.

Figure 3:
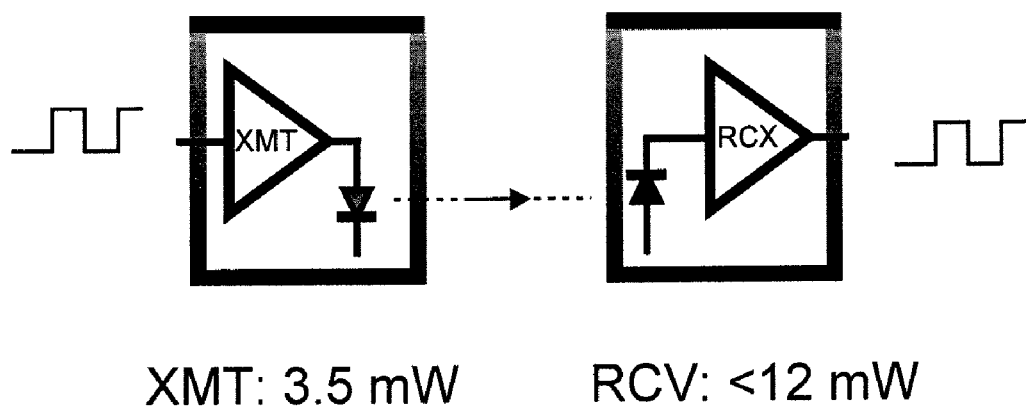
FIG. 3 is a schematic representing estimated power dissipation of an embodiment of these teachings.

The power dissipation for a single bi-directional channel can be similar or different from two uni-directional channels. When optical interconnect technology is used for bidirectional channels, these distinctions become important. For example, power estimations are compared below based on an early optical multichannel data pipe technology with 125 Mbps operation per channel at a 50% duty cycle. Each channel contains two endpoints. For the uni-directional case, the transmit endpoint dissipates an estimated power of 3.5 mW. The corresponding receive endpoint dissipates an estimated power of less than 12 mW. This is illustrated in FIG. 3. The total estimated power dissipation per unidirectional channel is therefore less than 15.5 mW.

Figure 4:
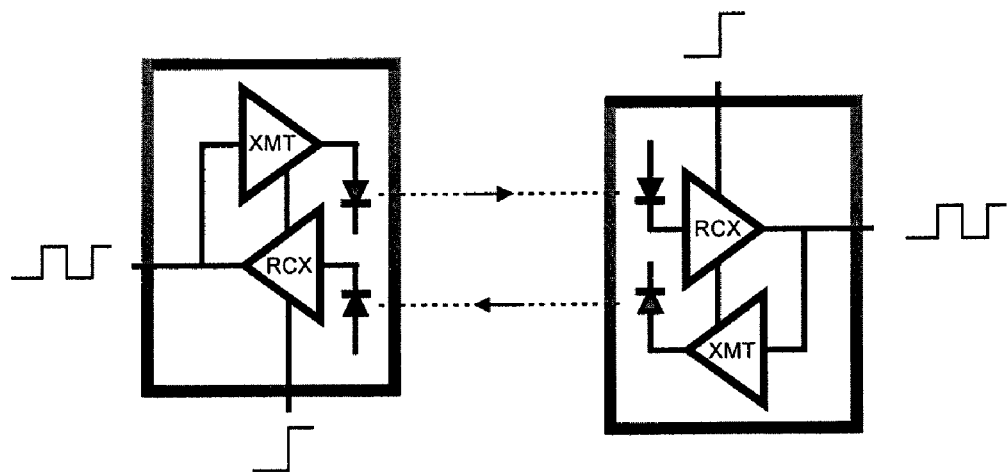
FIG. 4 is a schematic representing estimated power dissipation of another embodiment of these teachings.

For the bi-directional channel both endpoints are more similar. The bidirectional channel (with emitter and receiver at each of its endpoints) dissipates <15.5 mW in each of the two modes, assuming the same component devices, and there is a slight additional switching overhead required to switch between the channels. Since power is dissipated only during switching, and since the switching frequency is typically extremely low compared to the data rate, a budget of 1 mW for this overhead is expected to be very generous. This is illustrated in FIG. 4.

Thus, the overall bi-directional channel should dissipate less than 16.5 mW, or a bi-directional endpoint power dissipation of 8.25 mW.

Figure 5:
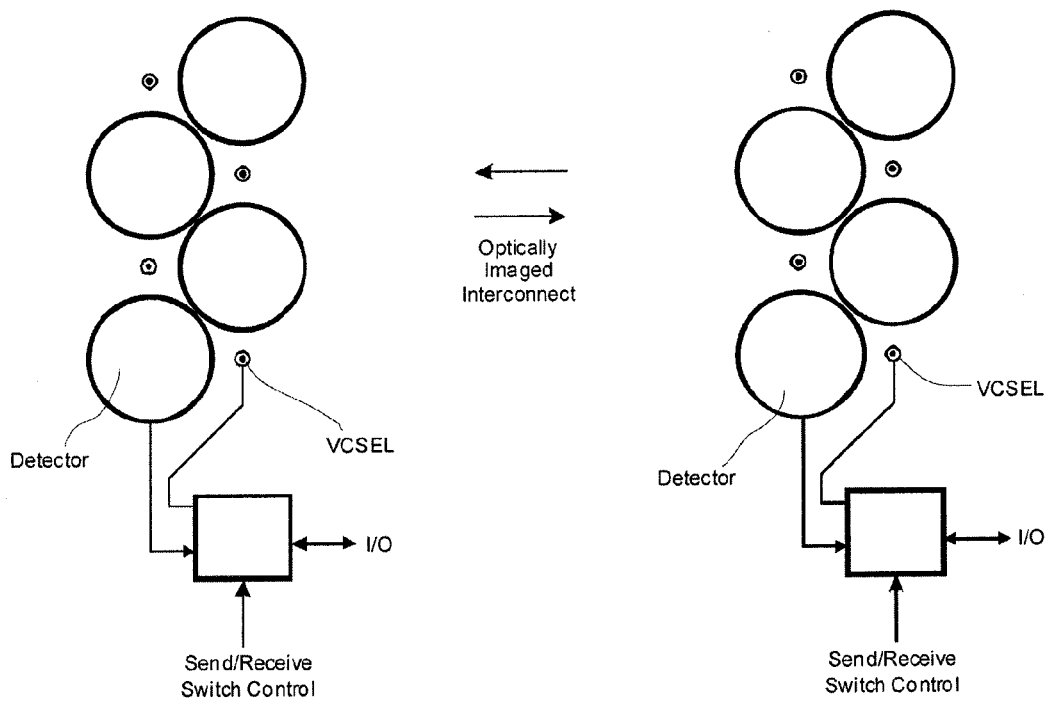
FIG. 5 is a diagram of both endpoints of a bidirectional channel set in an array of channels of an embodiment of these teachings.

In one embodiment of the present teachings, shown in FIG. 5, the send or receive state of the bidirectional channel is directly controlled. In this embodiment each end of each bi-directional optical channel consists of an emitter/detector pair. The emitter/detector pair are connected to an interface that has a send/receive switch control signal input and a channel I/O signal. When the switch control signal sets its end of the bidirectional optoelectronic channel to the send state, the interface connects the I/O signal to the VCSEL or emitter through optional emitter-driver circuitry in the interface. When the switch control signal sets its end of the bidirectional optoelectronic channel to the receive state, the interface connects the detector output signal to the I/O signal through optional amplifier, thresholding, and electrical driver circuitry in the interface. In other words, the emitter/detector pair are interfaced to a single end use, hardware I/O signals generally via an independent, and channel specific detector amplifier and VCSEL driver circuit through a switch with an send/receive control line. (A variety of switch devices are described in Horowitz and Hill, The Art of Electronics, ISBN 0-521-23151-5, pp. 242-245, pp. 582-589, which is incorporated by reference herein.) A switch control signal determines whether the bi-directional optical channel is in the send or receive mode.

The bidirectional optoelectronic channels of the present teachings may be used separately or in arrays of one or higher dimension. The lower part of FIG. 5 illustrates both endpoints (at left and at right) of one bidirectional optoelectronic channel located in an array of optoelectronic channels. The other emitter and detector pairs can in the arrays can be configured with their own interface as described above to provide an array of bidirectional optoelectronic channels. The imaging detail is not shown in the figure for this discussion but it is assumed that this is an optical interconnect that uses optical imaging or other optical means (e.g, waveguides or optical fibers) to couple the light from emitters to corresponding detectors from each end of the bidirectional optoelectronic interconnect to the other. Thus, the emitters (VCSELs) are imaged onto mating detectors from end to end. As described above, the lower left pair of detector and VCSEL may form one end of the bidirectional channel being described, and the lower right pair of detector and VCSEL may form the other end of the bidirectional channel being described. In a simpler form of the embodiment shown in FIG. 5, the interface can simply be a switch, in which the output from the detector and the input to the VCSEL at each end of this bidirectional channel may be routed to a switch at each end of the channel. Each such switch also may have an I/O port and a send/receive switch control port as shown in the figure.

The other three detector/VCSEL pairs shown in FIG. 5 at each end of the array of bidirectional channels schematically represent other bidirectional channels but are not shown here in detail. For example, the interface or switch shown at each end of the lower bidirectional channel is not shown on the ends of these upper channels in FIG. 5 for clarity.

When the interface or switch is set to the send mode by the switch control signal, the I/O port may be routed to the VCSEL. Alternately when the switch is set to the receive mode by the switch control signal, the output of the detector may be routed to the I/O port. The analog signal from the detector may be routed directly to the switch or intervening digital circuitry for thresholding and amplification which, for example may reside between the detector and the switch or after the switch. Generally, the channel may be operated so that when one end is in send mode the other end is in receive mode and vice versa. This send/receive control signal may be sent directly from prior knowledge by the host circuitry or application (the host circuitry or application is a conventional signal source such as a source of digital signals, for example a computer and associated circuitry—e.g. logic gates—, or a source of analog signals) or, alternatively, there are many other schemes to control the bidirectional channel. For example, in another embodiment of the bidirectional optoelectronic channel of the present teachings, the detector in a bi-directional communication channel may be monitored (e.g., through the switch I/O port or at the detector, or at another point) for an incoming 'START' signal and set into the appropriately desired send or receive mode for a known interval. The 'START' or query signal, for example, may be, but is not limited to, a specific data pattern or pulse duration interval.

Figure 6:
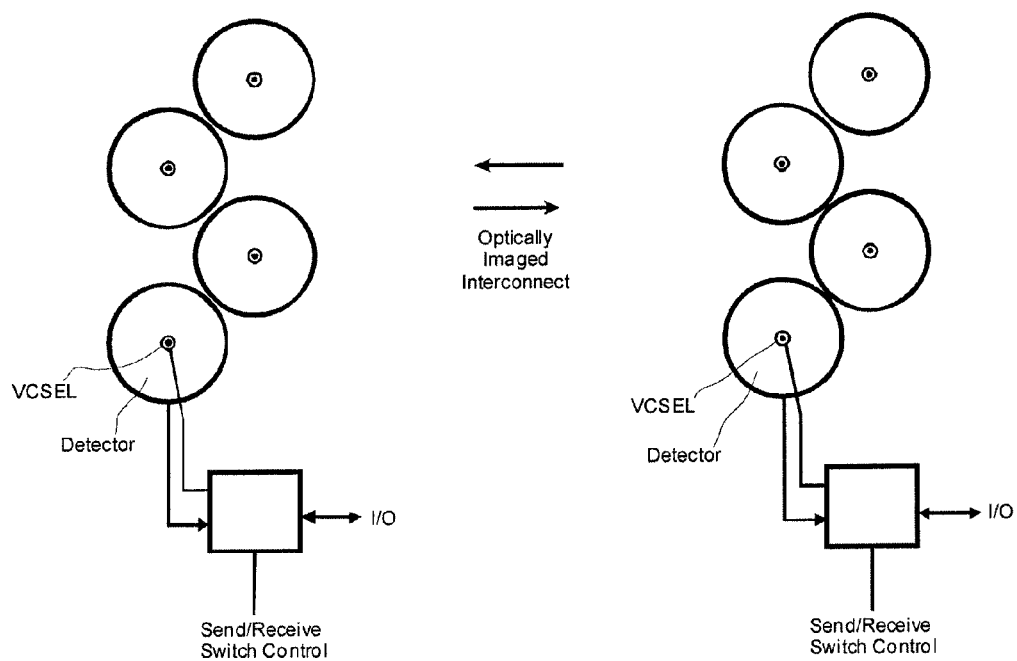
FIG. 6 is a diagram of a compact embodiment of the channel of FIG. 5.

FIG. 6 shows a compact embodiment of the Direct Control Bidirectional Optical Interconnect Channel of FIG. 5. In the embodiment of the present teachings shown in FIG. 6, each emitter or VCSEL is located in a tiny island in the middle of the larger detector area, forming a compact circular bidirectional transceiver element. The spot size of the imaging system used in this optical interconnect is made to be much larger than the tiny emitter area, but roughly smaller than or equal to the detector area. Thus when the optical interconnect couples light between the corresponding localized bidirectional transceiver elements bidirectional optoelectronic channels are formed.

The lower circular bidirectional transceiver element on the left may form one end of the bidirectional channel being described, and the lower circular bidirectional transceiver element on the right may form the other end of the bidirectional channel being described. The output from the detector and the input to the VCSEL at each end of this bidirectional channel may be routed to a switch or interface at each end of the channel as described above. Each such switch/interface may also have an I/O port and a send/receive switch control port as shown in the figure.

The other three circular bidirectional transceiver elements shown at each end of the array of bidirectional channels schematically represent other bidirectional channels but are not shown here in detail. For example, the switch shown at each end of the lower bidirectional channel for the ends of these upper channels is not shown for clarity.

When the switch is set to the send mode by the switch control signal, the I/O port may be routed to the VCSEL. Alternately when the switch is set to the receive mode by the switch control signal, the output of the detector may be routed to the I/O port. The analog signal from the detector may be routed directly to the switch or intervening digital circuitry for thresholding and amplification which, for example (not shown), may reside between the detector and the switch or on the other side of the switch. Generally, the channel is operated so that when one end is in send mode the other end is in receive mode and vice versa. This send/receive control can be sent directly from prior knowledge by the host circuitry or application or, alternatively, there are many other schemes to control the bidirectional channel. For example, in another embodiment of the bidirectional optoelectronic channel of the present teachings, the detector in a bi-directional communication channel can be monitored (e.g., through the switch I/O port or at the detector, or at another point) for an incoming 'START' signal and set into the appropriately desired send or receive mode for a known interval. The 'START' or query signal, for example, can be a specific data pattern or pulse duration interval.

Figure 7:
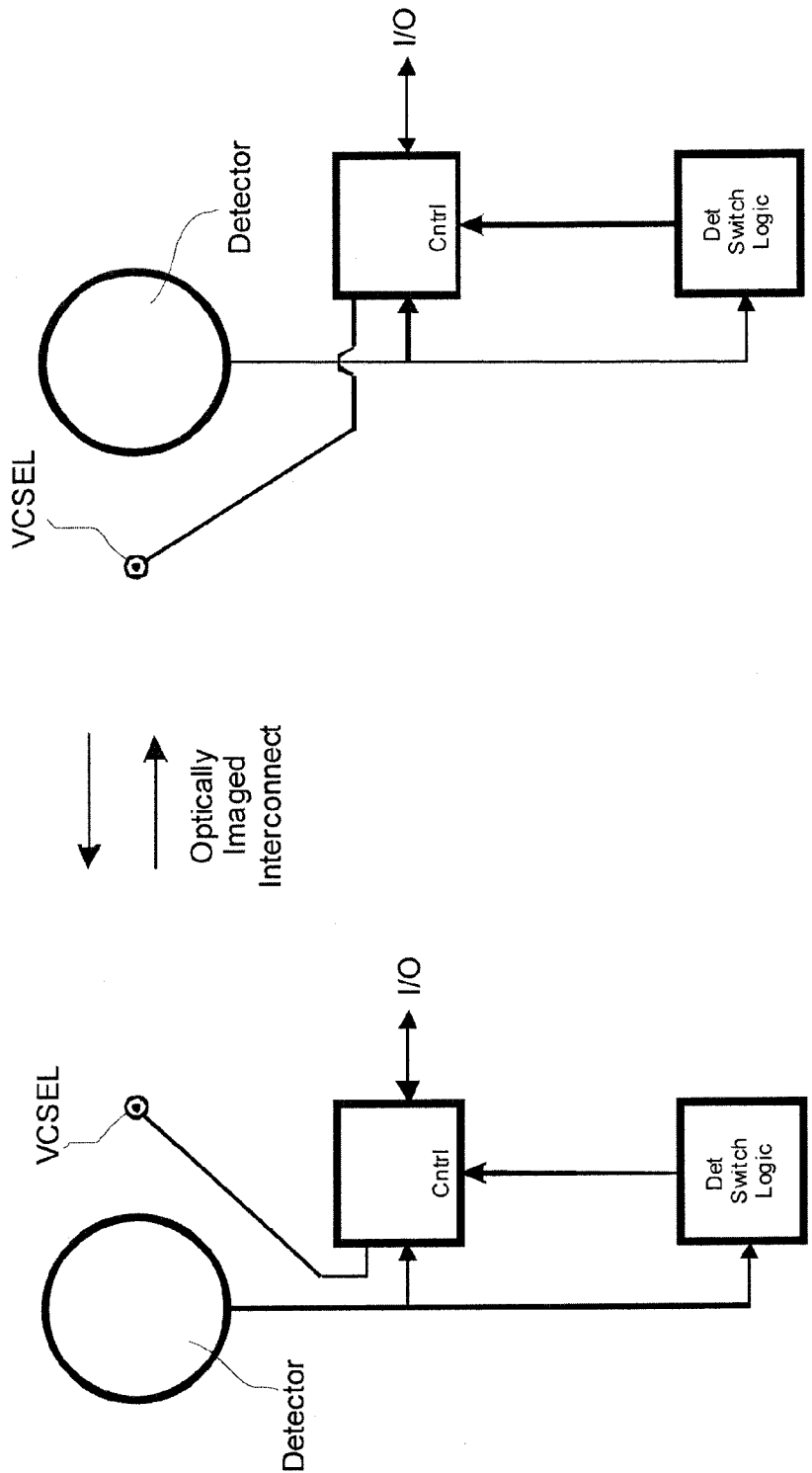
FIGS. 7-9 are diagrams of other embodiments of the system of these teachings.

Another embodiment of the present teachings is the Local Autonomous Control Bidirectional Optical Interconnect Channel shown in FIG. 7. This bidirectional optical interconnect Channel is similar to the embodiments shown in FIGS. 5 and 6 except that the control input for the switch is now locally derived from the detector output. In this embodiment, the detector output is not only input to the switch or interface, but is also input to additional detector switch logic as shown in FIG. 7.

Based on the received signal from the detector, the detector switch logic may determine when the bidirectional channel should be in send or receive mode. This local autonomous control may be implemented in many ways. For example, although not limited to this embodiment, a bi-directional communication channel may be monitored for an incoming "START" signal that is decoded at the specific channel logic interface circuit level. This accepted "START" signal may then set the channel direction function to the appropriately desired send or receive mode for a known interval. The "START" or query signal may be a specific data pattern or pulse duration interval. (A variety of protocol concepts, with similar data preambles or headers, are conventionally used.). The composite bidirectional optoelectronic channels of FIG. 6 may be used to replace the neighboring detector and VCSEL pairs in the configuration of FIG. 7 as was done to the embodiment of FIG. 5.

Figure 8:
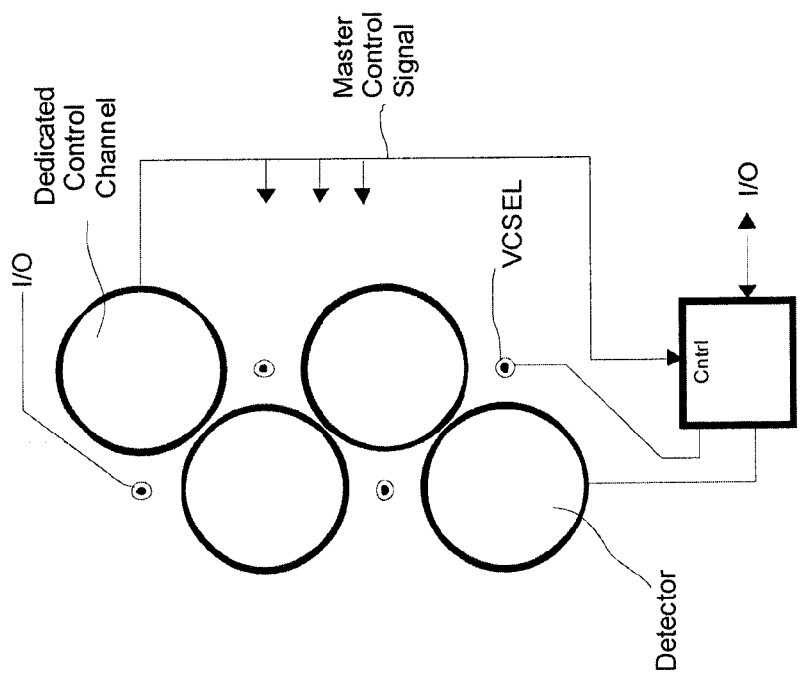
Figure 8:
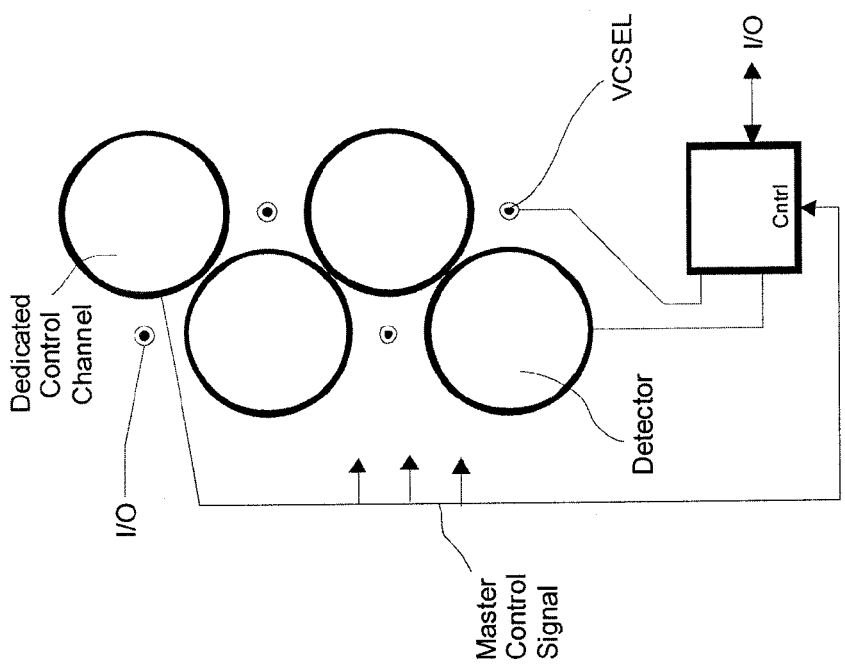

Another embodiment of the present teachings is the Dedicated Handshake Bidirectional Optoelectronic Channel shown in FIG. 8, although not limited to this embodiment.

In this embodiment of the present teachings, a dedicated control channel may be used to set the transmit or receive state of one or all the other bidirectional optical interconnect channels in the array. In FIG. 8, the upper detector and VCSEL on each end of the optical interconnect are shown as a dedicated control channel. The output of the detector from this control channel, with optional amplification, thresholding, application, and logic, is shown setting the state of the transmit/receive switch in the lower bidirectional optical interconnect Channel. This master control signal is also shown schematically breaking off to optionally control switches for other bidirectional optical interconnect channels of the optical interconnect channel array. Other dedicated control channels may be used to control other bidirectional optical interconnect channels or other subarrays of bidirectional optical and connect channels in the bidirectional optoelectronic channel array. The VCSELs in the dedicated control channels, labeled I/O, may be used to send the desired control information to the corresponding detector at the other end of the dedicated control channel. Control and operation of the Dedicated Handshake Bidirectional Optoelectronic Channel may be accomplished in many ways. For example, although not limited to this embodiment, one method is to use dedicated signal channels as handshaking control lines to determine the data flow direction. ("Handshaking" is described in Horowitz and Hill, The Art of Electronics, ISBN 0-521-23151-5, p. 521, which is incorporated by reference herein in its entirety.) In addition, although not limited to this embodiment, a memory data bus might use a READ/WRITE control signal line to set the direction of data flowing to or from a memory device. As another example, although not limited to this embodiment, an RS232 serial link could use a clear to send or clear the receive signal line to manage the data flow direction across a common data signal carrier line.

Figure 9:
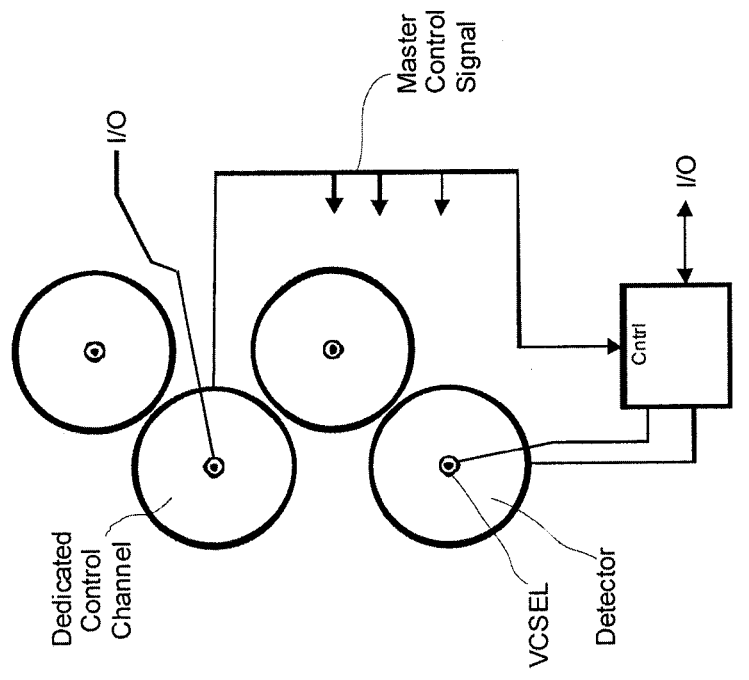
Figure 9:
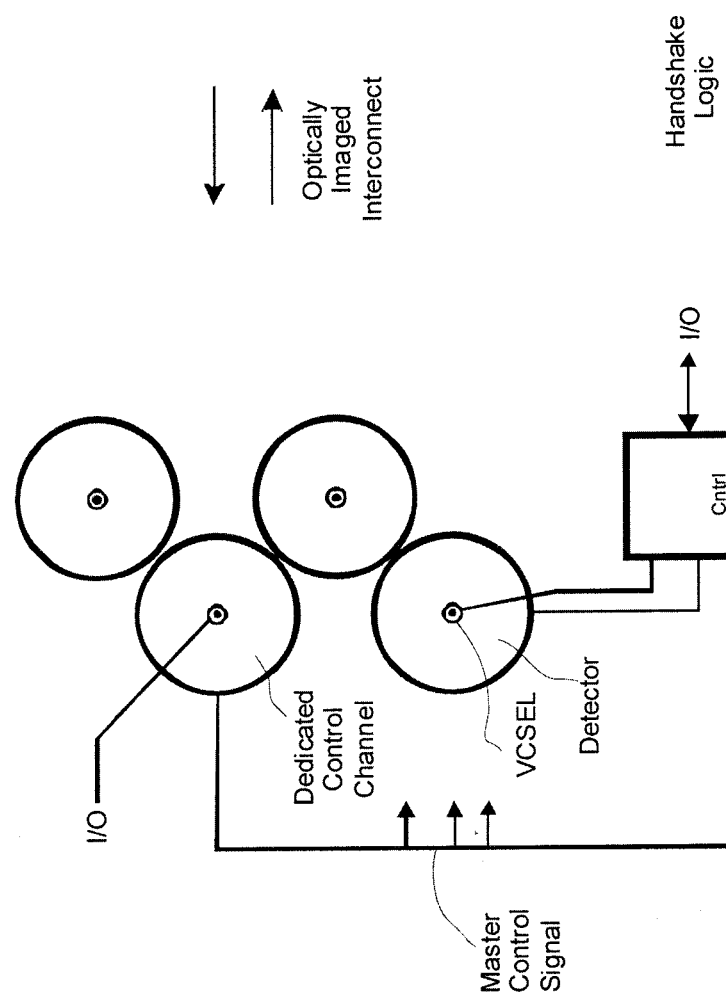

The composite bidirectional transceiver elements of FIG. 6 may be used to replace the neighboring detector and VCSEL pairs in the Dedicated Handshake Bidirectional Optoelectronic Channel configuration of FIG. 8 similarly to the embodiment of FIG. 5. This is illustrated in the Compact Dedicated Handshake Bidirectional Optical Interconnect Channel in FIG. 9.

While the present teachings has been described above in terms of specific embodiments, it is to be understood that the teachings are not limited to these disclosed embodiments. Many modifications and other embodiments of the teachings will come to mind to those skilled in the art to which these teachings pertains, and which are intended to be and are covered by this disclosure. It is intended that the scope of the teachings should be determined by proper interpretation and construction of the disclosure, as understood by those of skill in the art relying upon the disclosure in this specification and the appended claims.

What is claimed is:

1. An optical interconnect comprising:
    an optical subsystem having a first end and a second end;
    at least two emitter subsystem/detector subsystem combinations directly optically connected to said first end; each emitter subsystem emits electromagnetic radiation; each detector subsystem receives electromagnetic radiation;
    at least two other emitter subsystem/detector subsystem combinations directly optically connected to said second end;
    each emitter subsystem/detector subsystem combination comprising:
        a first emitter/detector subsystem pair comprising:
            a first emitter subsystem;
            a first detector subsystem; and
            a switching component switching input/output signals to/from one subsystem selected from said first emitter subsystem and said first detector subsystem; said switching component being operatively connected to said first emitter subsystem and said first detector subsystem; said switching component receiving a switch control signal;
    said optical subsystem configured to image electromagnetic radiation from said first emitter subsystem in at least one of said at least two emitter subsystem/detector subsystem combinations and at least another one of said at least two other emitter subsystem/detector subsystem combinations into a number of beams of electromagnetic radiation; said optical subsystem also configured to provide a one-to-one optical interconnection between emitter subsystems from said at least two emitter subsystem/detector subsystem combinations and said at least two other emitter subsystem/detector subsystem combinations and corresponding detectors.

2. The optical interconnect of claim 1 wherein said switch control signal comprises a signal received at said first detector subsystem of said first emitter/detector subsystem pair.

3. The optical interconnect of claim 2 wherein said signal received at said first detector subsystem comprises a predetermined data pattern.

4. The optical interconnect of claim 2 wherein said signal received at said first detector subsystem comprises a predetermined pulse duration.

5. The optical interconnect of claim 1 wherein said first emitter subsystem from said first emitter/detector subsystem pair is disposed within a perimeter of said first detector subsystem from said first emitter/detector pair.

6. The optical interconnect of claim 1 wherein said first emitter subsystem from said emitter/detector subsystem pair is disposed substantially at a center of said first detector subsystem.

7. The optical interconnect of claim 1 wherein said switching component comprises:
    a switching control component receiving a signal from said first detector subsystem;
    a switching subsystem receiving input/output signals and receiving a control signal from said switching control component; said switching control signal utilized in order to determine switching of said input/output signals to/from one subsystem selected from said first emitter subsystem and said first detector subsystem.

8. The optical interconnect of claim 7 wherein said signal received at said first detector subsystem comprises a predetermined data pattern.

9. The optical interconnect of claim 7 wherein said signal received at said first detector subsystem comprises a predetermining pulse duration.

10. The optical interconnect of claim 1 wherein at least one emitter subsystem/detector subsystem combination further comprises:
    a second emitter/detector subsystem pair comprising:
        a second detector subsystem;
    and wherein said switching component receives a control signal from said second detector subsystem.

11. The optical interconnect of claim 10 wherein said second emitter/detector subsystem pair further comprises a second emitter subsystem.

12. The optical interconnect of claim 11 wherein said second emitter subsystem is disposed within a perimeter of said second detector subsystem.

13. The optical interconnect of claim 12 wherein said second emitter subsystem is disposed substantially at a center of said second detector subsystem.

14. The optical interconnect of claim 11 wherein said second emitter subsystem in said each emitter subsystem/detector subsystem combination provides control signals received by said second detector subsystem in said each emitter subsystem/detector subsystem combination.

15. The optical interconnect of claim 14 wherein said control signals comprise handshaking control signals.

16. A method for providing a bidirectional optical interconnect the method comprising the steps of:
    providing an optical interconnect comprising an optical subsystem having at least two emitter subsystem/detector subsystem combinations directly optically connected to one end of the optical subsystem and at least two other emitter subsystem/detector subsystem combinations fixedly optically connected to the other end of the optical subsystem; each emitter subsystem/detector subsystem combination having an emitter/detector subsystem pair; each detector subsystem pair having a switching component receiving a switch control signal and receiving/sending input/output signals; said optical subsystem configured to image electromagnetic radiation from said first emitter subsystem in at least one of said at least two emitter subsystem/detector subsystem combinations and at least another one of said at least two other emitter subsystem/detector subsystem combinations into a number of beams of electromagnetic radiation; said optical subsystem also configured to provide a one-to-one optical interconnection between emitter subsystems from said at least two emitter subsystem/detector subsystem combinations and said at least two other emitter subsystem/detector subsystem combinations and corresponding detectors;

receiving switch control signals in each emitter/detector subsystem pair;

determining, utilizing the control signals, switching the input/output signals to/from one subsystem from an emitter subsystem and a detector subsystem in at least one emitter/detector subsystem pair.

* * * * *

UNITED STATES PATENT AND TRADEMARK OFFICE
CERTIFICATE OF CORRECTION

| | | |
|---|---|---|
| PATENT NO. | : 8,247,756 B1 | Page 1 of 1 |
| APPLICATION NO. | : 12/477729 | |
| DATED | : August 21, 2012 | |
| INVENTOR(S) | : Randall C. Veitch et al. | |

It is certified that error appears in the above-identified patent and that said Letters Patent is hereby corrected as shown below:

In Column 8, line 55 (claim 16), "fixedly optically connected" should read -- directly optically connected --

Signed and Sealed this
Sixth Day of November, 2012

David J. Kappos
*Director of the United States Patent and Trademark Office*